(12) United States Patent
Yoneda et al.

(10) Patent No.: US 6,733,892 B1
(45) Date of Patent: May 11, 2004

(54) SURFACE TREATMENT COMPOSITION, METHOD OF SURFACE TREATMENT, SUBSTRATE AND ARTICLE

(75) Inventors: Takashige Yoneda, Kanagawa (JP); Fumiaki Gunji, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 277 days.

(21) Appl. No.: 09/508,080

(22) PCT Filed: Sep. 1, 1998

(86) PCT No.: PCT/JP98/03898
§ 371 (c)(1), (2), (4) Date: Apr. 12, 2000

(87) PCT Pub. No.: WO99/14284
PCT Pub. Date: Mar. 25, 1999

(30) Foreign Application Priority Data

Sep. 12, 1997 (JP) ............................................. 9-249089

(51) Int. Cl.$^7$ ............................. B32B 9/04; B05D 3/02; C08G 77/06
(52) U.S. Cl. ......................... 428/447; 428/429; 528/12; 528/36; 106/287.16; 427/299; 427/387; 427/389.7
(58) Field of Search ............................ 428/447, 429; 528/12, 36; 106/287.16; 427/299, 387, 389.7

(56) References Cited

U.S. PATENT DOCUMENTS

| | | | |
|---|---|---|---|
| 3,714,214 A | * 1/1973 | Hermes | 556/445 |
| 5,225,510 A | * 7/1993 | Bank et al. | 528/12 |
| 5,288,891 A | * 2/1994 | Sawada et al. | 556/448 |
| 5,314,731 A | 5/1994 | Yoneda et al. | 428/429 |
| 5,458,976 A | * 10/1995 | Horino et al. | 428/405 |
| 5,464,704 A | 11/1995 | Yoneda et al. | 428/429 |
| 5,482,768 A | 1/1996 | Kawasato et al. | 428/327 |
| 5,576,109 A | 11/1996 | Yoneda et al. | 428/447 |
| 5,599,893 A | * 2/1997 | Asai et al. | 528/12 |
| 5,605,958 A | 2/1997 | Yoneda et al. | 524/755 |
| 5,645,939 A | 7/1997 | Yoneda et al. | 428/429 |
| 5,762,697 A | * 6/1998 | Sakamoto et al. | 106/287.16 |
| 5,786,096 A | 7/1998 | Yoneda et al. | 428/447 |
| 5,871,843 A | 2/1999 | Yoneda et al. | 428/337 |
| 5,976,702 A | 11/1999 | Yoneda et al. | 428/429 |

FOREIGN PATENT DOCUMENTS

| | | |
|---|---|---|
| EP | 0 513 690 | 11/1992 |
| EP | 0 703 282 | 3/1996 |
| JP | 61-10043 | 1/1986 |
| JP | 5-009456 | 1/1993 |
| JP | 5-112757 | 5/1993 |
| JP | 5-146745 | 6/1993 |
| JP | 5-319868 | 12/1993 |
| JP | 6-184527 | 7/1994 |
| JP | 7-179850 | 7/1995 |

\* cited by examiner

*Primary Examiner*—Elena Tsoy
(74) *Attorney, Agent, or Firm*—Oblon, Spivak, McClelland, Maier & Neustadt, P.C.

(57) ABSTRACT

The object of the present invention is to provide a surface treatment composition having excellent storage stability and waterdrop rolling property.

The present invention provides a surface treatment composition containing a partial hydrolysate of a fluorine-containing reactive silane such as $C_8F_{17}CH_2CH_2Si(OCH_3)_3$ having a molecular weight of M measured by GPC, wherein the proportion of molecules with molecular weights of from 300 to at most 2M in the partial hydrolysate is less than 70%, and the proportion of molecules with molecular weights of from 6M to 100000 in the partial hydrolysate is less than 10%.

The present invention also provides a method of surface treatment of glass with the surface treatment composition.

The present invention also provides a substrate treated with the surface treatment composition.

The present invention also provides an article incorporating the substrate such as a transport equipment.

25 Claims, No Drawings

SURFACE TREATMENT COMPOSITION, METHOD OF SURFACE TREATMENT, SUBSTRATE AND ARTICLE

TECHNICAL FIELD

The present invention relates to a surface treatment composition which imparts excellent water repellency and waterdrop rolling property to the surface of a substrate, a substrate treated with the surface treatment composition and a method for its production.

BACKGROUND ART

Glass, plastic, ceramic and metal substrates and substrates having treated surface layers are used in various fields. A problem with these substrates is the adverse effects of dirt on their surfaces such as water and dust.

For example, for transports such as electric railcars, automobiles, ships and aircrafts, it is desirable to keep the exterior parts such as outer panels, windowpanes, mirrors and surface panels of display signs, the interior parts such as surface panels of measuring instruments and other equipments clean. However, deposition of raindrops, dust and soil or water condensation due to the influence of the atmospheric humidity and temperature on the surfaces of transport equipments not only can cause a problem of damage to their appearances but also causes an uncomfortable impression and sanitary problems in a case of a directly visible or touchable substrate and impair the essential functions of the transport equipments. Especially, in cases of transport equipments required to be transparent or see-through such as windowpanes and mirrors, reduction in transparency and the see-through property is problematic.

On the other hand, removal of dust, soil or water by wiping or with a wiper can cause a problem of fine scratches on the substrate surface. Further, foreign particles accompanying dust, soil or water can aggravate the scratches. Furthermore, water deposited on a glass surface can erode the surface by eluting glass components and causes a phenomenon called "scorching". However, strong abrasion for removal of scorch marks can problematically lead to formation of fine irregularities. If severely scorched glass or glass having fine irregularities on the surface is used for a see-through part, it can ruin the essential function of the see-through part, causing terrible light scattering on the surface. Therefore, it is difficult to secure visibility.

In addition, dust, soil and water cause problems of promotion of damage, fouling, discoloration and corrosion on the surfaces of transport equipments and problems of induction of change in their electrical properties, mechanical properties and optical properties. These problems also exist in the fields of building materials and decorations and equipments for electric and electronic appliances.

Surface treatment of a substrate with a composition containing a partial hydrolysate of a fluorine-containing reactive silane as an essential component with a view to imparting the property of repelling waterdrops and removing their adverse effects (hereinafter referred to as water repellency), the antifouling property and low reflectivity, can be accomplished by known methods disclosed in the following publications.

JP-A-50-126033, JP-A-59-115840, JP-A-61-40845, JP-A-61-241143, JP-A-61-215235, JP-A-1-95181, JP-A-2-248480, JP-A-2-115801, JP-A-4-341379, JP-A-4-342444, JP-A-4-328188, JP-A-5-279499 and JP-A-1-170486.

These publications disclose partial hydrolysis of a fluorine-containing reactive silane with an acid such as hydrochloric acid, sulfuric acid, nitric acid, phosphoric acid, acetic acid and a sulfonic acid.

However, conventional compositions have problems of uneven application, unsatisfactory adhesiveness to a substrate and the unenduring antifouling property. Besides, treatment of a substrate incorporated in an article or in or after use with a water and oil repellent has to be done at ordinary temperature. For example, it is economically disadvantageous to detach the front windshield of an automobile which is already on sale for its treatment. Further, it is out of the question to treat the front windshield without detaching it and then bake the whole automobile. Because it is impossible to prepare a composition afresh each time treatment is done, such a composition is required to be functional over a long time and have good storage stability.

However, conventional compositions have limited applications due to problems of their low storage stability and difference in their post-storage performance. Conventional compositions proposed so far do not have the property of draining waterdrops on the surface of a substrate (hereinafter referred to as the waterdrop rolling property) as well as the above-mentioned properties and have a problem that when they are applied to transport equipments, visibility can not be secured.

DISCLOSURE OF THE INVENTION

The present inventors have studied to overcome the above-mentioned drawbacks of conventional compositions. As a result, they have found out that the above-mentioned drawbacks are attributed to inappropriately selected partial hydrolysis conditions which lead to a high proportion of molecules with low- or high-molecular weights in the resulting partial hydrolysate and a composition having large acid and water contents.

They have also found out that a surface treatment agent containing a specific partial hydrolysate is excellent in water repellency, antifouling property, waterdrop rolling property, adhesiveness (durability), abrasion resistance, chemical resistance and storage stability.

Namely, the present invention provides a surface treatment composition containing a partial hydrolysate of a fluorine-containing reactive silane represented by the following formula 1 as an essential component, which the proportion ($T_1$) of molecules with molecular weights of at most 2 M calculated from the following formula A in the partial hydrolysate is less than 70%, and the proportion ($T_2$) of molecules with molecular weights of at least 6 M calculated from the following formula B in the partial Th hydrolysate is less than 10%, wherein M is the molecular weight of the fluorine-containing reactive silane measured by gel permeation chromatography:

[Ka2]

$$(R^f\text{—}Q\text{—})_a (R^1)_b Si (X^1)_{4-a-b} \qquad \text{formula 1}$$ 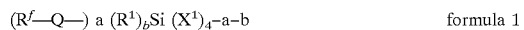

wherein $R^f$: a monovalent fluorine-containing $C_{1-30}$ organic group,

Q: a single bond or a bivalent linking group, $R^1$: a hydrogen atom or a monovalent $C_{1-16}$ organic group, a: 1 or 2, b: 0 or 1, and (a+b) is 1 or 2, and $X^1$: a hydrolyzable group,

[Su3]

$$T_1(\%)=[W_2/W_1]\times 100 \quad \text{formula A}$$

$$T_2(\%)=[W_3/W_1]\times 100 \quad \text{formula B}$$

wherein $W_1$: the total peak area within a molecular weight range of from 300 to 100000 on a gel permeation chromatogram of the partial hydrolysate of the fluorine-containing reactive silane, $W_2$: the total peak area within a molecular weight range of from 300 to 2 M on a gel permeation chromatogram of the partial hydrolysate of the fluorine-containing reactive silane, and $W_3$: the total peak area within a molecular weight range of from 6 M to 100000 on a gel permeation chromatogram of the partial hydrolysate of the fluorine-containing reactive silane.

BEST MODE FOR CARRYING OUT THE INVENTION $R^1$ in the fluorine-containing reactive silane (hereinafter referred to as compound 1) is a hydrogen atom or a monovalent $C_{1-16}$ organic group. An organic group means a carbon-containing group, and the monovalent organic group preferably has from 1 to 8 carbon atoms.

The monovalent $C_{1-16}$ organic group may be an organic group having halogen atoms, functional groups or linking groups and is preferably a monovalent hydrocarbon group or a monovalent organic group having halogen atom(s) which may have functional group(s) or linking group(s).

The monovalent hydrocarbon group may be a monovalent aliphatic hydrocarbon group or a monovalent aromatic hydrocarbon group, preferably an aliphatic hydrocarbon group. As the monovalent aliphatic hydrocarbon group, an alkyl group, an alkenyl group or a cycloalkyl group, preferably an alkyl group, particularly preferably an alkyl group having at most 4 carbon atoms such as a methyl group, an ethyl group, a propyl group or a butyl group may be mentioned. As the aromatic hydrocarbon group, an aryl group is preferable.

A monovalent halogenated organic group means a monovalent organic group having halogen atom(s) substituting for at least one hydrogen atom. As a mhalogen atom, a chlorine atom or a fluorine atom, particularly a fluorine atom, is preferable. The monovalent halogenated organic group is preferably a monovalent halogenated hydrocarbon group, particularly a halogenated alkyl group such as a chloroalkyl group, a fluoroalkyl group or a chlorofluoroalkyl group.

The monovalent halogenated organic group is preferably a monovalent polyfluoro-organic group having fluorine substituting for at least two hydrogen atoms in an organic group.

$R^f$ in compound 1 is a monovalent fluorine-containing $C_{1-16}$ organic group.

A monovalent fluorine-containing organic group means such a monovalent organic group as mentioned above in which at least one hydrogen atom is substituted by fluorine atom(s). $R^f$ may contain, in addition to fluorine, other halogen atom(s) or functional group(s) or may have a linking group between carbon-carbon bonds. The $R^f$ group preferably has from 3 to 18 carbon atoms, especially from 4 to 16 carbon atoms.

The monovalent polyfluoro-organic group is preferably a monovalent polyfluorohydrocarbon group, especially a polyfluoroalkyl group. A polyfluoroalkyl group means a an alkyl group in which at least two hydrogen atoms have been substituted by fluorine atoms. Hereafter a polyfluoroalkyl group will be expressed as "an $R^F$ group".

The $R^F$ group may have a linear or branched structure, preferably a linear structure. In the case of a branched structure, a branch preferably has at most 4 carbon atoms. The proportion of fluorine atoms in the $R_F$ group is preferably at least 60%, particularly at least 80%, when expressed as (the number of fluorine atoms in the $R^F$ group)/(the number of hydrogen atoms in the corresponding alkyl group having the same carbon atoms as the $R^F$ group).

The $R^F$ group may contain an ethereal oxygen atom (—O—) or a thioethereal sulfur atom (—S—). For example, a polyfluorooxalkyl group, a polyfluorothioalkyl group or a group containing such a group may be mentioned. As the polyfluorooxalkyl group, a group having a polyfluoroethyleneoxy moiety or a polyfluoropropyleneoxy moiety or a group having a polyfluoroethyloxy moiety or a polyfluoropropyloxy moiety may be mentioned. As the polyfluorothioalkyl group, a group having a polyfluoroethylenethio moiety or a polyfluoropropylenethio moiety or a group having a polyfluoroethylthio moiety or a polyfluoropropylthio moiety may be mentioned. The $R^F$ group may have a functional group.

The group $R^F$ is preferably a perfluoroalkyl group which corresponds to such an $R^F$ group as mentioned above in which all the hydrogen atoms have been replaced by fluorine atoms or a group containing such a perfluoroalkyl group or a perfluoroalkylene group as a part of its structure. The perfluoroalkyl group in the $R^F$ group has preferably from 3 to 18 carbon atoms, and the perfluoroalkylene group in the $R^F$ group has preferably from 2 to 18 carbon atoms. The $R^F$ group is preferably a perfluoroalkyl group.

Q is a single bond or a bivalent linking group, preferably a bivalent linking group. When Q is a single bond, the formula 1 means that $R_F$ is directly bonded to Si. The carbon atom in the $R_F$ group which is directly bonded to a bivalent linking group is preferably bonded to at least one fluorine atoms. The bivalent linking group as Q is selected from known or common bivalent linking groups and exemplified in the after-mentioned specific examples of compound 1. Q is preferably alkylene group, particularly —$(CH_2)_e$— (wherein e is an integer of from 1 to 6, preferably 2 or 3). $R^f$ —Q— in the formula 1 is preferably a monovalent organic group represented by $CF_3(CF_2)_d(CH_2)_e$— (wherein d is an integer of from 2 to 17, and e is the same as defined above).

$X^1$ in compound 1 is a hydrolyzable group such as —$OR^3$ (wherein $R^3$ is a $C_{1-6}$ alkyl group), an acyloxy group, an alkoxy-substituted alkoxy group, a halogen atom, an isocyanato group, aminoxy group, an amido group, an acid amido group, a ketoxymate group, a hydroxyl group, a mercapto group, an epoxy group or a glycidyl group. According to the present invention, the hydrolyzable group includes an isocyanato group. $R^3$ in —$OR^3$ is preferably a methoxy group or an ethoxy group.

$X^1$ in compound 1 is preferably —$OR^3$ or a halogen atom, particularly —$OR^3$. The halogen atom as $X^1$ is preferably a chlorine atom, and the alkoxy group as $X^1$ is preferably an alkoxy group having at most 4 carbon atoms. The number of $X^1$ in compound 1 is 2 or 3, preferably 3. Namely, (a+b) is 1 or 2, preferably 1. a is preferably 1, and b is preferably 0.

As compound 1 in the present invention, the following compounds may be mentioned. In the following formulae, $R^f$, Q, $R^1$ and $X^1$ are the same as defined above, and m is an integer of at least 1.

[Ka 3]

(A-1): $R^fC_2H_4Si(X^1)_3$ (A-2): $R^fC_2H_4Si(X^1)_2$
        |
        $R^1$ (A-3): $(R^fC_2H_4)_2Si(X^1)_2$   (A-4): $R^fC_2H_4NH(CH_2)_2Si(X^1)_3$ (A-5): $R^fCONHC_3H_6Si(X^1)_3$ (A-6): $R^fCONHC_3H_6Si(X^1)_2$
        |
        $R^1$ (A-7): $R^fCONHC_2H_4NHC_3H_6Si(X^1)_3$ (A-8): $R^fCONHC_2H_4NHC_3H_6Si(X^1)_2$
        |
        $R^1$ (A-9): $R^fCON(CH_3)C_2H_4CON(CH_3)Si(X^1)_3$ (A-10): $R^fCON(CH_3)C_2H_4CON(CH_3)Si(X^1)_2$
         |
         $R^1$ (A-11): $R^fC_2H_4OCO(CH_2)_2S(CH_2)_3Si(X^1)_3$ (A-12): $R^fC_2H_4OCO(CH_2)_2S(CH_2)_3Si(X^1)_2$
         |
         $R^1$ (A-13): $R^fC_2H_4OCONH(CH_2)_3Si(X^1)_3$ (A-14): $R^fC_2H_4OCONH(CH_2)_3Si(X^1)_2$
         |
         $R^1$ (A-16): $R^fC_2H_4NH(CH_2)_2Si(X^1)_2$
         |
         $R^1$ (A-17): $CF_3C_2F_4O(CFCF_2O)_mCFCONH(CH_2)_3Si(X^1)_3$
                        |                |
                        $CF_3$           $CF_3$ (A-18): $CF_3C_2F_4O(CFCF_2O)_mCFCONH(CH_2)_3Si(X^1)_2$
                        |                |              |
                        $CF_3$           $CF_3$         $R^1$

The compound of the present invention contains a partial hydrolysate of compound 1 as an essential component. The partial hydrolysate of compound 1 is the product of partial hydrolysis of compound 1 which may contain a thoroughly hydrolyzed fraction. Compound 1 itself does not fall under the definition of the partial hydrolysate.

The partial hydrolysate of compound 1 may be the product of partial hydrolysis of more than one species of compound 1. The partial hydrolysate of compound 1 in the present invention may be the product of co-hydrolysis of at least one species of compound 1 and at least one species of compound 2 mentioned below. In the following formula 2, $R^f$, Q, $R^1$ and $X^1$ are the same as defined above, and $R^2$ is a hydrogen atom or a $C_{1-16}$ organic group. Preferable embodiments of R are the same as those of $R^1$.

[Ka4]

$$(R^f\text{—}Q\text{—})(R^1)(R^2)Si(X^1) \qquad \text{formula 2}$$

In the present invention, the partial hydrolysate is preferably the product of hydrolysis of at least one species of compound 1 and is usually a mixture of at least two product components. A coating obtained by applying the composition of the present invention which contains the partial hydrolysate is excellent in the waterdrop rolling property, durability and workability.

In the present invention, a crude reaction liquid obtained after partial hydrolysis is preferably used as the composition of the present invention by itself or after addition necessary additives.

For synthesis of the partial hydrolysate of compound 1, known hydrolytic methods are basically applicable. However, because the partial hydrolysate in the present invention is characterized by a specific molecular weight distribution, the reaction conditions have to be strictly controlled. Reaction conditions such as the species and amount of compound 1, the amount of water, the amounts and species of the other reagents, the reaction procedure, the reaction time and temperature govern the molecular weight distribution.

Compound 1 preferably has the group —$OR^3$ as $X^1$ in view of easiness in control of the molecular weight distribution of the partial hydrolysate. Compound 1 wherein $X^1$ is the group —$OR^3$ is represented by the following formula 1'.

[Ka5]

$$(R^f\text{—}Q\text{—})_a(R^1)_bSi(\text{—}OR^3)_{4-a-b} \qquad \text{formula 1'}$$

In the formula 1', $R^f$, Q, $R^1$, a, b and $R^3$ are the same as defined above, and their preferable embodiments are the same as mentioned above. In the present invention, compounds wherein a is 2, and b is 0 are preferable.

The compound represented by the formula 1' [hereinafter referred to as compound 1'] is characterized in that it hydrolyzes slower than compound 1 wherein $X^1$ is a halogen atom and is therefore preferably because it does not generate precipitates upon abrupt hydrolysis and facilitates molecular weight control.

Further, the amount (moles) of water used for the hydrolysis is preferably so adjusted that the H value calculated from the following formula C is from 2 to 7.

[Su4]

H=[the total number of moles of water used for the hydrolysis]/
[the total number of moles of X1 in compound 1 used for the hydrolysis]     formula C If the H value is less than 2, the hydrolysis does not proceed sufficiently and yields a partial hydrolysate with a large low-molecular weight fraction, and the waterdrop rolling property and coating durability can be insufficient. On the other hand, if the H value exceeds 7, the hydrolysis proceeds too fast and yields a partial hydrolysate with a large high-molecular weight fraction, and the workability and coating durability can be insufficient.

For partial hydrolysis of compound 1 in the present invention, the following basic methods a to c are preferable.
[Method a] Mixing of compound 1 and water.
[Method b] Mixing of compound 1 and water in the presence of an acid.

[Method c] Mixing of compound 1 and water in the presence of an alkali.

In the present invention, method b is preferable in view of easiness of molecular weight control. The acid in method b is preferably sulfuric acid, hydrochloric acid, nitric acid, methanesulfonic acid, phosphoric acid or acetic acid. As the acid in method b, nitric acid is particularly preferable in view of workability, easiness in handling and physical properties of coatings. With the other acids, the following defects are conceivable. Hydrochloric acid and sulfuric acid can affect surfaces to be treated and cause inconveniences in handling of the resulting composition. Sulfuric acid can decompose the resulting partial hydrolysate. Methanesulfonic acid, phosphoric acid and acetic acid can lead to inefficient production of the partial hydrolysate because of their weak acidities.

When nitric acid is used for the hydrolysis, the amount of nitric acid in mole is preferably from 0.001 to 0.1 time that of compound 1. If the amount of nitric acid is too small, the reaction rate is likely to be too low, while if the amount of nitric acid is too large, the reaction rate is likely to be too high for molecular weight.

In any of methods a to c, the hydrolysis is preferably carried out in the presence of an organic solvent. When an organic solvent is used, it is preferred to firstly dissolve compound 1 in the organic solvent. The amount of an organic solvent used for the hydrolysis is preferably so adjusted that the composition contains compound 1 in an amount of 0.1 wt % to 10 wt % in view of economy, coating thickness, control of the hydrolysis and workability.

Specific examples of the organic solvent include alcohol solvents, cellosolve solvents, carbitol solvents, acetate solvents, ketone solvents, ester solvents and halogenated hydrocarbon solvents. Alcohol solvents, especially lower alcohol solvents such as ethanol or isopropyl alcohol, are preferable. One or more organic solvents may be used. It is preferred to appropriately select an organic solvent in view of the solvent resistance of the substrate, the size of the substrate, the vaporization rate of the solvent and economy.

The reaction time of the partial hydrolysis is preferably from 3 to 250 hours, and the reaction temperature is preferably from 15 to 80° C.

Method b in which nitric acid is used as the acid may be exemplified by the following specific methods $b^1$ and $b^2$, and method $b^2$ is particularly preferable.

[Method b] Addition of predetermined amounts of nitric acid and water to compound 1.

[Method b] Addition of a previously prepared aqueous nitric acid solution to compound 1.

In method $b^2$, an aqueous nitric acid solution may be added to compound 1 at a time or gradually, preferably gradually, particularly preferably dropwise.

The partial hydrolysate in the present invention has to satisfy a specific molecular weight distribution upon molecular weight measurement by gel permeation chromatography (hereinafter referred to as GPC) over a molecular weight range of 300 to 100000. A molecular weight measured by GPC is not strictly the same as the total atomic weight of the respective elements.

A molecular weight measured by GPC is based on that of a known substance (a standard). In the present invention, a molecular weight is based on that of polystyrene. In the present invention, molecular weights are preferably measured by the following method. Namely, polystyrene with a known molecular weight within the range of from 300 to 100000 is chromatographed to give a GPC chromatogram. Then, the detection time and molecular weight of the polystyrene on the chromatogram are correlated to give a calibration curve. The detection time of a partial hydrolysate of compound 1 is converted into its molecular weight on the calibration curve.

The surface treatment agent of the present invention is substantially free from partial hydrolysate molecules of molecular weights of more than 100000, because partial hydrolysate molecules of molecular weights higher than 100000 impair the performance of the composition as a surface treatment agent by forming precipitates in the composition or causing gelation of the composition.

The proportion of the partial hydrolysate in the composition is determined as follows. Namely, the molecular weight, M, of compound 1 is determined from its GPC chromatogram. Compound 1 in the present invention preferably has a molecular weight (M) of from 300 to 1000, particularly from 400 to 800. When more than one species of compound 1 are used for partial hydrolysis, the highest of their molecular weights measured by GPC is defined as M.

Then, the proportion ($T_1$ value) of molecules with molecular weights of from 300 to 2 M in the partial hydrolysate is determined from the areas of the peaks on a GPC chromatogram of the hydrolysate. The $T_1$ value can be calculated from the following formula A.

[Su5]

$$T_1 (\%) = [W_2/W_1] \times 100 \qquad \text{formula A}$$

wherein $W_1$: the total peak area within a molecular weight range of from 300 to 100000 on a GPC chromatogram of the partial hydrolysate of the fluorine-containing reactive silane, and $W_2$: the total peak area within a molecular weight range of from 300 to 2 M on a GPC chromatogram of the partial hydrolysate of the fluorine-containing reactive silane.

In the present invention, the $T_1$ value is less than 70%, preferably from 10 to 60%. A $T_1$ value of less than 70% secures a good waterdrop rolling property and excellent durability.

The presence of a large amount of partial hydrolysate molecules with high molecular weights in the composition is undesirable. Especially, molecules of molecular wrights of 6 M or higher are undesirable because increase of their proportion leads to gelation of the composition. The proportion ($T_2$ value) of molecules with molecular weights of from 6 M to 100000 in the partial hydrolysate can be calculated from the following formula B.

[Su6]

$$T_2 (\%) = [W_3/W_1] \times 100 \qquad \text{formula B}$$

wherein $W_1$: the total peak area within a molecular weight range of from 300 to 100000 on a GPC chromatogram of the partial hydrolysate of the fluorine-containing reactive silane, and $W_3$: the total peak area within a molecular weight range of from 6 M to 100000 on a GPC chromatogram of the partial hydrolysate of the fluorine-containing reactive silane.

The $T_2$ value is preferably less than 10%, particularly from 0 to 5%.

If the $T_2$ value is not less than 10%, namely if the proportion of molecules with molecular weights of at least 6 M in the partial hydrolysate of the fluorine-containing reactive silane compound is high, the workability during surface treatment is terribly poor, and the durability of the resulting coating can be poor.

Further, the proportion of molecules of molecular weights of from 2 to 6 M in the partial hydrolysate of compound 1 is preferably from 30 to 100%, particularly from 40 to 90%, when expressed as the proportion of the total peak area within a molecular weight range of from 2 M to 6 M on a GPC chromatogram of the hydrolysate to $W_1$. Control of this proportion is preferable to secure an excellent waterdrop rolling property, good workability and coating durability. The amount of compound 1 in the composition is preferably controlled to at most 10 wt %.

Further, the weight-average mean molecular weight of the partial hydrolysate of compound 1 is preferably from 1.6 M to 3.5 M, particularly from 1.8 M to 2.8 M. In general, the composition of the present invention preferably contains an organic solvent as well as the partial hydrolysate of compound 1. The organic solvent is usually the one used for the hydrolysis, but if necessary, another organic solvent may be added. The composition of the present invention will be described below as containing an organic solvent.

The composition contains the partial hydrolysate of compound 1 preferably in an amount of from 0.1 to 10 wt % and an organic solvent in such an amount that the final concentration of compound 1 is from 0.1 to 10 wt %. Further, it is preferred to use an organic solvent with a boiling point suitable for the treating area in view of the application conditions for the composition of the present invention, and an organic solvent having a boiling point of from 60 to 200° C., particularly from 70 to 150° C. is preferable.

The water and oil repellent composition of the present invention usually further contains the water used for the hydrolysis. The amount of water in the composition is an important factor for the storage stability of the composition and preferably from 0.5 to 3 wt %. The presence of more than 3 wt % of water can not only make the composition less stable by causing a change in the liquid composition during storage but also make the composition less workable by retarding drying of the composition.

The amount of nitrate ion in the composition is also j important in respect of storage stability and preferably from 0.005 to 0.1 wt %. The presence of more than 0.1 wt % of nitrate ion can make the composition less stable by causing a change in the liquid composition during storage.

The water and oil repellent composition of the present invention may contain additives which meet particular purposes. As additives, ultrafine particles of metals and metal oxides, resins, antioxidants, surfactants, ultraviolet absorbers, colorants such as dyes and pigments and electrical conductors may be mentioned. It is preferred to select additives by considering the compatibility and reactivity with other constituents. The amount of additives in the composition is preferably less than 20 wt %. 20 wt % or more of additives can lower the waterdrop rolling property, durability and workability.

The composition of the present invention imparts excellent properties such as water repellency, an antifouling property and a water dripping property to the surface of a substrate when applied to the surface. As the substrate, substrates made of metals, ceramics, plastics, glass and other inorganic materials, substrates made of organic materials and substrates made of combinations of at least two selected from inorganic and organic materials (composites or laminates) may be mentioned.

The substrate may also have a surface made of a different material and may have a coated surface like a coated metal plate or a surface treatment layer like a surface-treated glass. The shape of the substrate may be planar or have a totally or partly curved surface.

The composition of the present invention can be applied by common methods. It is noteworthy that the composition of the present invention can be applied to a substrate incorporated in another article or a substrate in or after use because it can exert excellent performance even applied at ordinary temperature.

The substrate is preferred to have functional groups which can react with $X^1$ on the surface. A substrate having functional groups on the surface can make the effects of the composition last longer. As the functional groups, hydroxyl groups, isocyanato groups, sulfonic groups, amino groups and carboxyl groups may be mentioned, and hydroxyl groups are preferable. As a substrate having hydroxyl groups on the surface, a substrate having many hydroxyl groups on the surface, particularly a glass substrate, is preferable.

On the other hand, when the substrate has no functional groups on the surface or when the number of functional groups on the surface of the substrate is insufficient, it is preferred to subject the substrate to pretreatment.

Examples of pretreatment include sandblast treatment, abrasive treatment with cerium oxide particles or the like, acidic treatment with hydrofluoric acid or the like, alkaline treatment with sodium hydroxide or the like, discharge treatment by corona discharge or the like and formation of a film having functional groups. For formation of a film having functional groups, a glass film may be formed by a sol-gel method.

The above-mentioned pretreatment methods are classified according to their main purposes as those which increase the number of available functional groups by cleansing the substrate surface ($d^1$ methods) and those which actually increase the number of hydroxyl groups on the substrate surface ($d^2$ methods).

Among the $d^1$ methods, abrasive cleansing using abrasive particles is preferable. As abrasive particles, particles of cerium oxide, alumina, silica, zirconia, diamond or calcium carbonate are preferable.

Among the $d^2$ methods, the sol-gel method and formation of a film derived from a hydrolyzable silane other than compound 1 on the substrate surface are preferable. As the hydrolyzable silane, a compound represented by the following formula 3 (hereinafter referred to as compound 3) and/or a partial hydrolysate of compound 3 is preferable.

[Ka6]

formula 3 wherein $R^3$, $R^4$ and $R^5$: independently a monovalent fluorine-free $C_{1-16}$ organic group, d, e and f: independently 0, 1, 2 or 3, provided that (d+e+f) is 0, 1, 2 or 3, $X^2$: a hydrolyzable group.

$R^4$, $R^5$ and $R^6$ are preferably organic groups having a vinyl group, an epoxy group, a glycidyl group, a hydroxyl group, an amino group, an isocyanato group or a mercapto group as a functional group.

$X^2$ is preferably the hydrolyzable group exemplified in the explanation of compound 1 and is preferably an alkoxy group or an isocyanato group.

Specific examples of formula 3 include the following compounds.

Tetraalkoxysilanes such as tetramethoxysilane, tetraethoxysilane, tetra(n-propoxy)silane, tetra(i-propoxy)

silane, tetra(n-butoxy)silane, tetra(sec-butoxy)silane and tetra(t-butoxy)silane;

trialkoxysilanes such as methyltrimethoxysilane, methyltriethoxysilane, methyltrimethoxyethoxysilane, ethyltriethoxysilane, vinyltrimethoxysilane, phenyltriethoxysilane, γ-chloropropyltrimethoxysilane, γ-chloropropyltriethoxysilane, 3,3,3-trifluoropropyltrimethoxysilane, chloromethyltrimethoxysilane, chloromethyltriethoxysilane;

γ-methacryloxypropyltrimethoxysilane, γ-mercaptopropyltrimethoxysilane, γ-rmercaptopropyltriethoxysilane, γ-aminopropyltrimethoxysilane, γ-aminopropyltriethoxysilane, N-β-(aminoethyl)-γ-aminopropyltrimethoxysilane, β-cyanoethyltriethoxysilane;

glycidoxymethyltrimethoxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxy- propyltriethoxysilane;

γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltrimethoxyethoxysilane, α-glycidoxybutyltrimethoxysilane, α-glycidoxybutyltriethoxysilane, β-glycidoxybutyltrimethoxysilane, β-glycidoxybutyltriethoxysilane, γ-glycidoxybutyltrimethoxysilane, γ-glycidoxybutyltriethoxysilane, δ-glycidoxybutyltrimethoxysilalne, δ-glycidoxybutyltriethoxysilane;

(3,4-epoxycyclohexyl)methyltrimethoxysilane, (3,4-epoxycyclohexyl)methyltrimethoxysilane, β-(3,4-epoxycyclohexyl)ethyltrimethoxysilane, β-(3,4-epoxycyclohexyl)ethyltripropoxysilane, β-(3,4-epoxycyclohexyl)ethyltributoxysilane, β-(3,4-epoxycyclohexyl)ethyltrimethyltrimethoxyethoxysilane;

γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane and δ-(3,4-epoxycyclohexyl)butyltriethoxysilane;

triacyloxysilanes such as methyltriacetoxysilane, vinyltriacetoxysilane, phenyltriacetoxysilane and γ-chloropropyltriacetoxysilane;

triphenoxysilanes such as methyltriphenoxysilane, γ-glycidoxypropyltriphenoxysilane, β-(3,4-epoxycyclohexyl)ethyltriphenoxysilane;

dialkoxysilanes such as dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, γ-methacryloxypropylmethyldimethoxysilane, methacryloxypropylmethyldiethoxysilane;

γ-mercaptopropylmethyldiiethoxysilane, γ-mercaptopropylmethyldiethoxysilane, γ-iaminopropyl- methyldimethoxysilane, γ-aminopropylmethyldiethoxysilane, methylvinyldimethoxysilane, methylvinyldiethoxysi lane;

glycidoxylmethylmethyldimethoxysilane, glycidoxymethylmethyldimethoxysi lane, α-glycidoxyethylmethyldimethoxysilane, α-glycidoxyethylmethyl- diethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoxypropylmethyldimethoxysilane, β-glycidoxypropylmethyldiethoxysilane;

γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldimethoxyethoxysilane, γ-glycidoxypropylethyldiethoxysilane, γ-glycidoxypropylethyldipropoxysilane, γ-glycidoxypropylvinyldimethoxysilane, γ-glycidoxypropylvinyldiethoxysilane and γ-glycidoxypropylphenyldiethoxysilane; and diphenoxysilanes such as dimethyldiacetoxysilane and γ-glycidoxypropylmethyldiphenoxysilane.

As compound 3, those wherein d+e+f=0, particularly tetraalkoxysilanes [Si(OR)$_4$] and tetraisocyanatosilanes [Si(NCO)$_4$], are preferable.

Compound 3 may used as such or in the form of a partial hydrolysate. In treatment of a substrate having functional groups with the composition, it is preferred to chemically bond the partial hydrolysate of compound 1 to the functional groups on the substrate surface. A partial hydrolysate of compound 1 usually has residual intact $X^1$ which shows high reactivity at room temperature. Therefore, the partial hydrolysate can be chemically bound without special treatment.

The water and oil repellent composition of the present invention can be applied by conventionally known coating methods such as spin coating, dip coating, various types of print coating, spray coating, brush coating, flow coating, hand coating and squeegee coating. These methods may also be employed for pretreatment.

After having been applied, the composition is dried. The drying may be natural drying. Namely, when dried at ordinary temperatures of about from 0° C. to 50° C., the composition of the present invention can work well. However, heat may be applied to increase the drying rate or impart high durability. Heat drying is preferably done at 50° C. to 40° C., particularly at 80° C. to 400° C. for from 5 to 30 minutes. Drying conditions are determined in view of what to be treated and economy.

Concerning application of the composition, it is effective to bring a substrate having a surface treated with the composition (hereinafter referred to as a treated substrate) into contact with various solvents. Contact with a solvent is preferable because it removes residual intact reactants on the surface to improve the waterdrop rolling property and prevents poor appearance due to uneven treatment. The solvent which is brought into contact with a treated substrate is preferably selected from the above-mentioned organic solvents which may be incorporated in the composition and preferably an organic solvent, if any, contained in the composition. An appropriate organic solvent may be selected in view of the work environment, working efficiency, economy and solvency.

Contact between a treated substrate and a solvent may be effected, for example, by wiping with appropriate cloth or tissue paper impregnated with the solvent, spreading drops of the solvent on the treated substrate with tissue paper or the like, soaking the treated substrate in a bath of the solvent or spraying the solvent onto the treated substrate.

The thickness of the resulting coating is preferably from the thickness of a monomolecular film to 0.1 $\mu$m because too thick a coating problematically accentuates defects or is uneconomical. The thickness of a coating can be suitably controlled by the treating method, the concentration of the composition and the drying conditions.

A treated substrate having been treated with the composition of the present invention is preferably a substrate made of a transparent material such as glass. A treated substrate may be used for various purposes by itself as an article or after incorporated in another article.

The article may be composed of a treated substrate alone or may be an article which incorporates a treated substrate. For example, it may be a glass substrate having a treated surface as an automobile windshield or a mirror incorporating a glass having a treated surface as an automobile rearview mirror part.

Other preferable articles incorporating treated substrates are equipments for transports. As transports, electric railcars, buses, trucks, automobiles, ships and aircrafts may be mentioned. As equipments for transports, exterior parts such as windowpanes, mirrors, CCD lenses and surface panels of display signs and interior parts such as surface panels of measuring instruments incorporated in transports, other transport equipments to use or in use for transports and other constituting parts of transports may be mentioned. More specifically, bodies, windowpanes and pantographs of electric railcars, bodies, front windshields, side windshields, rear windshields, mirrors and bumpers of automobiles, buses and trucks and bodies and windowpanes of ships and aircrafts may be mentioned.

The treated substrate of the present invention or an article incorporating it has a water-repellent surface, and therefore water deposited thereon forms waterdrops. Further, by virtue of its excellent waterdrop rolling property, when the article is used for a transport, it is possible to prevent waterdrops from staying on the surface because waterdrops rapidly rolls on the surface of the article as the transport moves due to the wind pressure they receive. Thus, it is possible to eliminate adverse effects of water on the surface of the article. Thus, when the article is a see-through part such as a windshield, it is possible to secure visibility and therefore safe operation. Another advantage of the excellent waterdrop rolling property imparted to the surface of a treated substrate is that waterdrops are drained from the treated substrate even when the transport is moving at such a low speed that barely generates wind pressure or standing.

Further, the treated substrate of the present invention hardly ices up even under an environment where waterdrops on the surface otherwise freeze, and has an advantage that even if icing occurs, it can be defrosted quite quickly. Further, because deposition of waterdrops can be prevented, it requires less frequent cleaning operations. Further, because the surface of the treated substrate also has an antifouling property, it is advantageous to keep good appearance.

The mechanism of the excellent performance of the surface treatment agent of the present invention has not been fully elucidated but is presumed as follows.

A partial hydrolysate of compound 1 in the present invention usually has both the hydrophobic $R^f$ groups and the hydrophilic groups ($X^1$) which remain intact after hydrolysis. In order for the composition having these groups to show a good waterdrop rolling property when applied to a substrate, it is important to align the $R^f$ groups outside while minimizing $X^1$ on the surface.

If the $X^1$ groups form chemical bonds with groups on the surface of the substrate such as hydroxyl groups on a glass surface, there is no possibility of $X^1$ aligned on the surface. However, when the surface treatment agent is actually applied, not all the $X^1$ groups react with groups on the substrate surface. In such a case, the $R^f$ groups in the partial hydrolysate somewhat align on the surface but randomly, and supposedly, the surface treatment agent can not work satisfactorily well. Residual intact $X^1$ on the coating surface is supposed to act to deteriorate the waterdrop rolling property.

Any molecules of the partial hydrolysate in the present invention fall within a molecular weight range of from 2 M to 6 M. Molecules of the partial hydrolysate having relatively high molecular weights are advantageous because they have a large number of $X^1$ which tend to be located inside. In addition, supposedly, molecules with higher molecular weights have lower degrees of freedom in their molecular motion and are more likely to settle down to an energetically stable conformation with the $R^f$ groups aligned on the surface to impart a good waterdrop rolling property. Decrease of molecules with relatively low molecular weights in the partial hydrolysate likely contributes to improvement of the coating durability.

EXAMPLES

Now, the present invention will be described with reference to Examples. Various evaluations in the Examples were done by the following methods.

1. Evaluation of Water Repellency

The contact angle of water was measured.

2. Evaluation of the Waterdrop Rolling Property

On a sample substrate which was held horizontally (at an angle 0°), 50 $\mu$l of water were dropped in droplets, and the sample substrate was inclined. The angle between the substrate and a horizontal plane at which the water droplets started to roll was read.

3. Evaluation of the Waterdrop Holding Property

Water was sprayed over the entire surface of a vertically standing sample from a nozzle held at a distance of 20 cm from the sample for 1 hour, and the waterdrops remaining on the sample surface were observed with the naked eye and evaluated under the following standard.

A: No waterdrops remain on the sample surface.
B: Waterdrops remain on more than 0% to 30% of the sample surface.
C: Waterdrops remain on more than 30% to 70% of the sample surface.
D: Waterdrops spread over more than 70% of the sample surface.

4. Evaluation of Durability

The water repellency, waterdrop rolling property and water holding property were evaluated after 6 hours of immersion in boiling water.

5. Evaluation of Workability 15 cc of a water and oil repellent composition was dropped onto the surface of an abrasively cleansed glass substrate (100 cm×100 cm) and spread with tissue paper like car waxing. The workability during the spread was evaluated under the following standard.

○: The spread took 5 minutes or less.
Δ: The spread took more than 5 minutes but less than minutes.
X: The spread took 15 minutes or more.

6. Method for Molecular Weight Measurement

Instrument: HLC8020 (TOSOH CORPORATION)
Columns: TSKgel G4000HXL for the molecular weight range of from 1000 to 100000 TSKgel G2000HXL for the molecular weight range of from 100 to 10000
Eluent: Tetrahydrofuran
Flow rate: 0.8 ml/min
Detector: RI
Injection volume: 20 μl
Inlet temperature: 35° C.
Column temperature: 40° C.
Detector temperature: 35° C.
Calibration curve: expressed as polystyrene Compounds used in the Examples Compound 1a: $CF_3(CF_2)_7(CH_2)_2Si(OCH_3)_3$,
Compound 1b: a mixture of $CF_3(CF_2)_n(CH_2)_2Si(OCH_3)_3$ wherein n is 5, 7, 9 and 11 and averages 8.
Compound 1c: $CF_3(CF_2)_7(CH_2)_3Si(OCH_3)_3$,
Compound 1d: $CF_3(CF_2)_2OCF(CF_3)CF_2OCF(CF_3)CONH(CH_2)_3Si(OCH_3)3$,
Compound 1e: $CF_3(CF_2)_7(CH_2)_2OCO(CH_2)_2S(CH_2)_3Si(OCH_3)_3$,
Compound 3a: $Si(NCO)_4$,
Compound 3b: $Si(OCH_2CH_3)_4$.

Example 1

94.64 g of 2-propanol and 3.41 g of Compound 1a were stirred in a glass reactor equipped with a thermometer and a stirrer at 25° C. for 10 minutes, and then 1.95 g of 0.6 wt % aqueous nitric acid was gradually added dropwise. 10 days of continuous stirring at 25° C. after the dropwise addition afforded water and oil repellent composition 1. The hydrolysis conditions and the results of measurement of the molecular weight of the product are shown in Table 1.

In Table 1, the molar ratio of water is the ratio of water in aqueous nitric acid to the total moles of —$OCH_3$ in the compound prior to the hydrolysis, and the amounts of water and nitric acid are expressed as their proportions (unit: wt %) in the composition. $T_1$ and $T_2$ are the same as defined previously, and $M_w$ is the weight-average molecular weight.

2 cc of 60 wt % cerium oxide aqueous solution was dropped onto the surface of a soda lime glass plate of 10 cm×10 cm in size (thickness 3.5 mm), and the glass plate was abraded with a sponge elaborately. After the abrasion, the cerium oxide was washed away with water, and the glass plate was dried in air at 30° C. Then, 1 cc of the water and oil repellent composition was dropped onto the surface of the soda lime glass plate and spread with tissue paper like car waxing and dried in the atmosphere to give sample substrate 1. The results of evaluation of sample substrate 1 are shown in Table 2.

Example 2

The same reaction as in Example 1 was conducted except that the dropwise addition of aqueous nitric acid was followed by 10 days of continuous stirring at 50° C. to give water and oil repellent composition 2. The resulting composition was applied in the same manner as in Example 1 to give sample substrate 2. The hydrolysis conditions and the results of molecular weight measurement are shown in Table 1, and the results of evaluation of sample substrate 2 are shown in Table 2.

Example 3

95.61 g of 2-propanol and 3.41 g of Compound 1a were stirred in a glass reactor equipped with a thermometer and a stirrer at 25° C. for 10 minutes, and then 0.97 g of 0.6 wt % aqueous nitric acid was gradually added dropwise. 10 days of continuous stirring at 25° C. after the dropwise addition afforded water and oil repellent 3. The composition 3 was applied in the same manner as in Example 1 to give sample substrate 3. The hydrolysis conditions and the results of molecular weight measurement are shown in Table 1, and the results of evaluation of sample substrate 3 are shown in Table 2.

Example 4

90.09 g of 2-propanol and 3.41 g of Compound 1a were stirred in a glass reactor equipped with a thermometer and a stirrer at 25° C. for 10 minutes, and then 6.49 g of 0.6 wt % aqueous nitric acid was gradually added dropwise. 10 days of continuous stirring at 25° C. after the dropwise addition afforded water and oil repellent composition 4. The composition 4 was applied in the same manner as in Example 1 to give sample substrate 4. The hydrolysis conditions and the results of molecular weight measurement are shown in Table 1, and the results of evaluation of sample substrate 4 are shown in Table 2.

Example 5

15 95.74 g of 2-propanol and 3.38 g of Compound 1b were stirred in a glass reactor equipped with a thermometer and a stirrer at 25° C. for 10 minutes, and then 0.89 g of 0.6 wt % aqueous nitric acid was gradually added dropwise. 10 days of continuous stirring at 25° C. after the dropwise addition afforded water and oil repellent composition 5. The composition 5 was applied in the same manner as in Example 1 to give sample substrate 5. The hydrolysis conditions and the results of molecular weight measurement are shown in Table 1, and the results of evaluation of sample substrate 5 are shown in Table 2.

Example 6

95.67 g of 2-propanol and 3.38 g of Compound 1c were stirred in a glass reactor equipped with a thermometer and a stirrer at 25° C. for 10 minutes, and then 0.95 g of 0.6 wt % aqueous nitric acid was gradually added dropwise. 10 days of continuous stirring at 25° C. after the dropwise addition afforded water and oil repellent composition 6. The composition 6 was applied in the same manner as in Example 1 to give sample substrate 6. The hydrolysis conditions and the results of molecular weight measurement are shown in Table 1, and the results of evaluation of sample substrate 6 are shown in Table 2.

Example 7

95.81 g of 2-propanol and 3.36 g of Compound 1d were stirred in a glass reactor equipped with a thermometer and a stirrer at 25° C. for 10 minutes, and then 0.84 g of 0.6 wt % aqueous nitric acid was gradually added dropwise. 10 days of continuous stirring at 25° C. after the dropwise addition afforded water and oil repellent composition 7. The composition 7 was applied in the same manner as in Example 1 to give sample substrate 7. The hydrolysis conditions and the results of molecular weight measurement are shown in Table 1, and the results of evaluation of sample substrate 7 are shown in Table 2.

Example 8

95.92 g of 2-propanol and 3.32 g of Compound 1e were stirred in a glass reactor equipped with a thermometer and a stirrer at 25° C. for 10 minutes, and then 0.76 g of 0.6 wt % aqueous nitric acid was gradually added dropwise. days of continuous stirring at 25° C. after the dropwise addition afforded water and oil repellent composition 8. The composition 8 was applied in the same manner as in Example 1 to give sample substrate 8. The hydrolysis conditions and the results of molecular weight measurement are shown in Table 1, and the results of evaluation of sample substrate 8 are shown in Table 2.

Example 9

The composition obtained in Example 1 was kept in an atmosphere with a humidity of 40% and a temperature of 20° for 120 days to give composition 9. The composition 9 was applied in the same manner as in Example 1 to give 3 sample substrate 9. The results of molecular weight measurement are shown in Table 1, and the results of evaluation of sample substrate 9 are shown in Table 2.

Comparative Example 1

The same reaction as in Example 1 was conducted except that the dropwise addition of aqueous nitric acid was followed by 1 day of continuous stirring at 25° C. to give water and oil repellent composition 11. The composition 11 was applied in the same manner as in Example 1 to give sample substrate 11. The hydrolysis conditions and the results of molecular weight measurement are shown in Table 1, and the results of evaluation of sample substrate 11 are shown in Table 2.

Comparative Example 2

The same reaction as in Example 1 was conducted except that 2-propanol was used in an amount of 96.26 g, and 0.6 wt % aqueous nitric acid was added dropwise in an amount of 0.33 g to give water and oil repellent composition 12. The composition 12 was applied in the same manner as in Example 1 to give sample substrate 12. The hydrolysis conditions and the results of molecular weight measurement are shown in Table 1, and the results of evaluation of sample substrate 12 are shown in Table 2.

Comparative Example 3

The same reaction as in Example 1 was conducted except that 1.95 g of 9.4 wt % aqueous nitric acid was used instead of 0.6 wt % aqueous nitric acid to give water and oil repellent composition 13. The composition 13 was applied in the same manner as in Example 1 to give sample substrate 13. The hydrolysis conditions and the results of molecular weight measurement are shown in Table 1, and the results of evaluation of sample substrate 13 are shown in Table 2.

Comparative Example 4

Composition 14 prepared by dissolving 3.41 g of compound 1a in 96.26 g of 2-propanol was applied in the same manner as in Example 1 to give sample substrate 14. The results of evaluation of sample substrate 14 are shown in Table 2.

Comparative Example 5

Composition 13 obtained in Comparative Example 3 was kept in an atmosphere with a humidity of 40% and a temperature of 20° C. for 300 days to give composition 15. Composition 15 contained a gel-like precipitate formed therein and was unable to be applied to a substrate.

TABLE 1

| Example | Composition | Molar ratio of water | Amount of water | Amount of nitric acid | $T_1$ | $T_2$ | $M_w$ |
| --- | --- | --- | --- | --- | --- | --- | --- |
| Example 1 | 1 | 6 | 1.936 | 0.012 | 56 | 0 | 1073(1.9M) |
| Example 2 | 2 | 6 | 1.936 | 0.012 | 34 | 0 | 1294(2.3M) |
| Example 3 | 3 | 3 | 0.964 | 0.010 | 65 | 0 | 972(1.8M) |
| Example 4 | 4 | 3 | 6.493 | 0.065 | 4 | 4 | 1796(3.2M) |
| Example 5 | 5 | 3 | 0.876 | 0.009 | 62 | 0 | 1030(1.8M) |
| Example 6 | 6 | 3 | 0.942 | 0.010 | 59 | 0 | 1089(1.9M) |
| Example 7 | 7 | 3 | 0.827 | 0.008 | 57 | 0 | 1191(1.8M) |
| Example 8 | 8 | 3 | 0.753 | 0.007 | 60 | 0 | 1400(1.9M) |
| Example 9 | 9 | 6 | 1.936 | 0.012 | 12 | 0 | 1544(2.7M) |
| Comparative Example 1 | 11 | 6 | 1.936 | 0.012 | 81 | 0 | 888(1.4M) |
| Comparative Example 2 | 12 | 1 | 0.321 | 0.003 | 95 | 0 | 761(1.3M) |
| Comparative Example 3 | 13 | 3 | 1.767 | 0.183 | 1 | 21 | 2168(3.8M) |

TABLE 2

| Example | Sample substrate | Initial Water repellency | Initial Waterdrop rolling property | Initial Waterdrop holding property | After durability test Water repellency | After durability test Water dripping property | After durability test Waterdrop holding property | Work-ability |
|---|---|---|---|---|---|---|---|---|
| Ex. 1 | 1 | 108 | 16 | A | 102 | 20 | A | ○ |
| Ex. 2 | 2 | 108 | 17 | A | 101 | 21 | A | ○ |
| Ex. 3 | 3 | 108 | 18 | A | 94 | 29 | B | ○ |
| Ex. 4 | 4 | 108 | 18 | A | 91 | 27 | B | Δ |
| Ex. 5 | 5 | 109 | 17 | A | 96 | 29 | B | ○ |
| Ex. 6 | 6 | 108 | 17 | A | 102 | 21 | A | ○ |
| Ex. 7 | 7 | 106 | 19 | A | 99 | 24 | A | ○ |
| Ex. 8 | 8 | 109 | 18 | A | 97 | 25 | A | ○ |
| Ex. 9 | 9 | 108 | 17 | A | 100 | 21 | A | ○ |
| Comp. Ex. 1 | 11 | 108 | 24 | A | 81 | 46 | C | ○ |
| Comp. Ex. 2 | 12 | 106 | 26 | A | 82 | 41 | C | Δ |
| Comp. Ex. 3 | 13 | 108 | 20 | A | 85 | 35 | B | Δ |
| Comp. Ex. 4 | 14 | 76 | 35 | C | 23 | — | D | ○ |

[Examples 10 To 12] Evaluation of Chemical Resistance

Sample substrates 1 [Example 10], sample substrate 2 [Example 11] and sample substrate 5 [Example 12] prepared as described above were immersed in the chemicals shown in Table 4 for 24 hours. After the immersion, the water repellency, waterdrop rolling property and waterdrop holding property of the sample substrates were evaluated. The results are shown in Table 3.

TABLE 3

| Example | Sample substrate | Chemicals | Water repellency | Waterdrop rolling property | Waterdrop draining property |
|---|---|---|---|---|---|
| 10 | 1 | Methanol | 106° | 18° | A |
|  |  | Acetone | 107° | 19° | A |
|  |  | 1% Aqueous Sulfuric acid | 107° | 18° | A |
|  |  | 1% Aqueous NaOH | 104° | 21° | A |
| 11 | 2 | Methanol | 107° | 18° | A |
|  |  | Acetone | 107° | 19° | A |
|  |  | 1% Aqueous sulfuric acid | 107° | 19° | A |
|  |  | 1% Aqueous NaOH | 105° | 22° | A |
| 12 | 3 | Methanol | 109° | 18° | A |
|  |  | Acetone | 107° | 17° | A |
|  |  | 1% Aqueous sulfuric acid | 108° | 18° | A |
|  |  | 1% Aqueous NaOH | 105° | 21° | A |

[Examples 13 to 15] Evaluation of Abrasion Resistance

Sample substrates 1 [Example 13], sample substrate 2 [Example 14] and sample substrate 5 [Example 15] prepared as described above were abraded with flannel cloth under a 1 kg load back and forth 1500 times. The results of evaluation of the water repellency, waterdrop rolling property and waterdrop holding property after the abrasion test are shown in Table 4.

TABLE 4

| Example | Sample substrate | Water repellency | Waterdrop rolling property | Waterdrop draining property |
|---|---|---|---|---|
| 13 | 1 | 104° | 17° | A |
| 14 | 2 | 105° | 18° | A |
| 15 | 5 | 104° | 19° | A |

Examples 16 to 18 Evaluation of Heat Resistance

Sample substrates 1 [Example 16], sample substrate 2 [Example 17] and sample substrate 5 [Example 18] prepared as described above were heated at 200° C. for 30 minutes. The results of evaluation of the water repellency, waterdrop rolling property and waterdrop holding property after the heating are shown in Table 5.

Example 19

10 cc of 2-propanol was dropped onto Sample substrate 1 prepared as described above and wiped with tissue paper like car waxing, and the water repellency, waterdrop rolling property and waterdrop holding property were evaluated. The results are shown in Table 5.

TABLE 5

| Example | Sample substrate | Initial | | | After durability test | | |
|---|---|---|---|---|---|---|---|
| | | Water repellency | Waterdrop rolling property | Waterdrop holding property | Water repellency | Waterdrop rolling property | Waterdrop holding property |
| 16 | 1 | 108 | 14 | A | 104 | 19 | A |
| 17 | 2 | 108 | 15 | A | 103 | 18 | A |
| 18 | 5 | 109 | 14 | A | 103 | 18 | A |
| 19 | 1 | 106 | 12 | A | 100 | 16 | A |

Example 20

99.0 g of butyl acetate and 1.00 g of Compound 3a were stirred in a glass reactor equipped with a thermometer and a stirrer at 25° C. for one day to give pretreatment solution 20. 2 cc of 60 wt % cerium oxide aqueous solution was dropped onto the surface of a soda lime glass plate of 10 cm×10 cm in size (thickness 3.5 mm), and the glass plate was abraded with a sponge elaborately. After the abrasion, the cerium oxide was washed away with water, and the glass plate was dried in air at 30° C.

Then, 1 cc of the pretreatment solution 20 was dropped onto the surface of the soda lime glass plate and spread with tissue paper like car waxing, and the glass plate was placed in an environment at 20° C. with a humidity of 50% for 1 hour to give pretreated substrate 20.

The pretreated substrate 20 was treated in the same manner as in Example 1 instead of the soda lime glass plate to give sample substrate 20. The results of evaluation of sample substrate 20 are shown in Table 6.

Example 21

78.80 g of ethyl alcohol and 10.40 g of Compound 3b were stirred in a glass reactor equipped with a thermometer and a stirrer at 25° C. for 10 minutes, and then 10.80 g of 0.6 wt % aqueous nitric acid was gradually added dropwise. 1 day of continuous stirring at 25° C. after the dropwise addition afforded pretreatment solution 21.

2 cc of 60 wt % cerium oxide aqueous solution was dropped onto the surface of a soda lime glass plate of 10 cm×10 cm in size (thickness 3.5 mm), and the glass plate was abraded with a sponge elaborately. After the abrasion, the cerium oxide was washed away with water, and the glass plate was dried in air. Then, 1 cc of pretreatment solution 21 was dropped and spread by spin coating (1000 rpm×10 seconds), and the glass plate was dried at 80° C. for 5 minutes to give pretreated substrate 21.

The pretreated substrate 21 was treated in the same manner as in Example 1 instead of the soda lime glass plate to give sample substrate 21. The results of evaluation of sample substrate 21 are shown in Table 6.

Example 22

The water and oil repellent composition 1 obtained in Example 1 was applied to the surface of a laminated glass for an automobile front windshield, and the laminated glass was fixed to an automobile. The automobile was actually used for 3 months, and then the condition of the surface of the front windshield was observed with the naked eye.

No deposition of dirt or dust or no formation of scale due to deposition of waterdrops during the use was observed, and if any, it could be wiped away with tissue paper easily. In rain, visibility was secured without use of wipers because waterdrops were repelled on the surface and dissipated rapidly with the aid of the wind pressure they received when the automobile was running. When the automobile was standing in rain, clear vision was secured without use of wipers because waterdrops rolled down gravitationally by virtue of the good waterdrop rolling property.

Further, no icing was observed on the front windshield even during a run in such conditions (−5 to 0 ° C.) that an untreated laminated front windshield would be iced due to waterdrops deposited thereon.

Example 23

When the laminated front windshield was changed to side windshields, a rear windshield and side mirrors, the same effects as in Example 22 were recognized.

Example 24

The surface of the front windshield of an automobile which had been used for three years was abraded with aqueous cerium oxide, washed with water and dried. The washed laminated front windshield was treated in the same manner as in Example 1. The automobile was subjected to a test run similar to that in Example 22, and the same effects were recognized.

Effects of the Invention

The surface treatment composition of the present invention imparts excellent water repellency, antifouling property, waterdrop rolling property, chemical resistance, anti-icing

TABLE 6

| Example | Initial | | | After durability test | | |
|---|---|---|---|---|---|---|
| | Water repellency | Waterdrop rolling property | Waterdrop holding property | Water repellency | Waterdrop rolling property | Waterdrop holding property |
| 20 | 110 | 15 | A | 108 | 18 | A |
| 21 | 111 | 16 | A | 108 | 19 | A | property and defrosting property to a substrate surface. The composition is also excellent in storage stability. The composition has the following effects on a treated substrate treated with the composition.

(1) It eliminates Adverse effects of water and simplifies cleaning operation by virtue of the excellent water repellency and waterdrop rolling property.

(2) It makes the substrate semipermanently usable by virtue of the lasting functional effects.

(3) It can be used for see-through parts of ships to be exposed to seawater by virtue of the excellent chemical resistance.

(4) It woks well without special pretreatment.

(5) It can show its properties upon treatment at ordinary temperature, and can be applicable to a substrate in use or after use, and therefore is advantageous environmentally and economically.

What is claimed is:

1. A surface treatment composition, comprising:
    a partial hydrolysate of a fluorine-containing reactive silane represented by Formula (1):

$$(R^f\!\!-\!\!Q\!\!-\!\!)_a(R^1)_b Si(X^1)_{4-a-b} \qquad \text{Formula (1)}$$

wherein
    $R^f$ is a monovalent fluorine-containing $C_{1\text{-}30}$ organic group;
    Q is a single bond or a bivalent linking group;
    $R^1$ is a hydrogen atom or a monovalent $C_{1\text{-}16}$ organic group;
    a is 1 or 2;
    b is 0 or 1, and (a+b) is 1 or 2; and
    $X^1$ is a hydrolyzable group;
    wherein a proportion ($T_1$) of a molecule with a molecular weight of at most 2 M in the partial hydrolysate is less than 70% as calculated from Formula (A), wherein M is a molecular weight of the fluorine-containing reactive silane measured by gel permeation chromatography:

$$T_1(\%)=[W_2/W_1]\times 100 \qquad \text{Formula (A);}$$

wherein
    $W_1$ is a total peak area within a molecular weight range of from 300 to 100000 on a gel permeation chromatogram of the partial hydrolysate of the fluorine-containing reactive silane; and
    $W_2$ is a total peak area within a molecular weight range of from 300 to 2 M on a gel permeation chromatogram of the partial hydrolysate of the fluorine-containing reactive silane;
    wherein a proportion ($T_2$) of a molecule with a molecular weight of at least 6 M in the partial hydrolysate is less than 10% as calculated from Formula (B):

$$T_2(\%)=[W_3/W_1]\times 100 \qquad \text{Formula (B);}$$

wherein
    $W_1$ is a total peak area within a molecular weight range of from 300 to 100000 on a gel permeation chromatogram of the partial hydrolysate of the fluorine-containing reactive silane; and
    $W_3$ is a total peak area within a molecular weight range of from 6 M to 100000 on a
    gel permeation chromatogram of the partial hydrolysate of the fluorine-containing reactive silane; and
    wherein the partial hydrolysate is obtained by partial hydrolysis of the fluorine-containing reactive silane in the presence of water and nitric acid.

2. The surface treatment composition according to claim 1, wherein the weight average molecular weight of the partial hydrolysate is from 1.6 M to 3.5 M.

3. The surface treatment composition according to claim 1, wherein $X^1$ is —$OR^3$; and
    wherein $R^3$ is a $C_{1\text{-}6}$ alkyl group.

4. The surface treatment composition according to claim 1, which contains from 0.005 to 0.100 wt % of nitrate ion.

5. The surface treatment composition according to claim 1, wherein a ratio of the total number of moles of water used for the hydrolysis to the total number of moles of $X^1$ in compound 1 used for the hydrolysis is from 2 to 7.

6. The surface treatment composition according to claim 1, which contains from 0.5 to 3 wt % of water.

7. A method of surface treatment of glass, comprising:
    applying the surface treatment composition according to claim 1 to the surface of a glass substrate.

8. The method according to claim 7, further comprising:
    drying said surface treatment composition.

9. The method according to claim 7, further comprising:
    drying said surface treatment composition; and
    contacting said surface treatment composition with a solvent.

10. The method of surface treatment of glass according to claim 8, wherein the surface treatment composition is dried at a temperature of 0° C. to 50° C. after it is applied to the glass substrate.

11. The method of surface treatment of glass according to claim 8, wherein the surface treatment composition is dried at a temperature of 50° C. to 400° C. after it is applied to the glass substrate.

12. The method of surface treatment of glass according to claim 8, wherein the surface treatment composition is dried for 5 to 30 minutes at a temperature of 80° C. to 400° C. after it is applied to the glass substrate.

13. The method of surface treatment of glass according to claim 8, wherein the glass substrate has an intact glass surface or a surface which has been subjected to pretreatment with a fluorine-free hydrolyzable silane compound or to abrasive cleansing.

14. A treated substrate, having a surface coating formed by applying the surface treatment composition according to claim 1 to the surface of the substrate and drying it.

15. The treated substrate according to claim 14, wherein the substrate is a glass substrate.

16. An article, comprising:
    the treated substrate according to claim 14.

17. An equipment for transports, comprising:
    the article according to claim 16.

18. The surface treatment composition according to claim 1,
    wherein a reaction solution containing said fluorine-containing reactive silane, water and nitric acid is stirred for 10 days to obtain said partial hydrolyzate.

19. A surface treatment composition, comprising:
    a partial hydrolysate of a fluorine-containing reactive silane represented by Formula (1):

$$(R^f\!\!-\!\!Q\!\!-\!\!)_a(R^1)_b Si(X^1)_{4-a-b} \qquad \text{Formula (1)}$$

wherein
    $R^f$ is a monovalent fluorine-containing $C_{1\text{-}30}$ organic group;

Q is a single bond or a bivalent linking group;

$R^1$ is a hydrogen atom or a monovalent $C_{1-16}$ organic group;

a is 1 or 2;

b is 0 or 1, and (a+b) is 1 or 2; and $X^1$ is a hydrolyzable group;

wherein a proportion ($T_1$) of a molecule with a molecular weight of at most 2 M in the partial hydrolysate is less than 70% as calculated from Formula (A), wherein M is a molecular weight of the fluorine-containing reactive silane measured by gel permeation chromatography:

$$T_1(\%) = [W_2/W_1] \times 100 \quad \text{Formula (A)};$$

wherein $W_1$ is a total peak area within a molecular weight range of from 300 to 100000 on a gel permeation chromatogram of the partial hydrolysate of the fluorine-containing reactive silane; and $W_2$ is a total peak area within a molecular weight range of from 300 to 2 M on a gel permeation chromatogram of the partial hydrolysate of the fluorine-containing reactive silane;

wherein a proportion ($T_2$) of a molecule with a molecular weight of at least 6 M in the partial hydrolysate is less than 10% as calculated from Formula (B):

$$T_2(\%) = [W_3/W_1] \times 100 \quad \text{Formula (B)};$$

wherein $W_1$ is a total peak area within a molecular weight range of from 300 to 100000 on a gel permeation chromatogram of the partial hydrolysate of the fluorine-containing reactive silane; and $W_3$ is a total peak area within a molecular weight range of from 6 M to 100000 on a gel permeation chromatogram of the partial hydrolysate of the fluorine-containing reactive silane; and wherein the partial hydrolysate is obtained by partial hydrolysis of the fluorine-containing reactive silane in the presence of water and nitric acid at a temperature of 25° C.

20. A surface treatment composition, consisting of:

a partial hydrolysate of a fluorine-containing reactive silane represented by Formula (1):

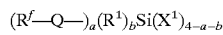  Formula (1)

wherein $R^f$ is a monovalent fluorine-containing $C_{1-30}$ organic group;

Q is a single bond or a bivalent linking group;

$R^1$ is a hydrogen atom or a monovalent $C_{1-16}$ organic group;

a is 1 or 2;

b is 0 or 1, and (a+b) is 1 or 2; and $X^1$ is a hydrolyzable group;

wherein a proportion ($T_1$) of a molecule with a molecular weight of at most 2 M in the partial hydrolysate is less than 70% as calculated from Formula (A), wherein M is a molecular weight of the fluorine-containing reactive silane measured by gel permeation chromatography:

$$T_1(\%) = [W_2/W_1] \times 100 \quad \text{Formula (A)};$$

wherein $W_1$ is a total peak area within a molecular weight range of from 300 to 100000 on a gel permeation chromatogram of the partial hydrolysate of the fluorine-containing reactive silane; and $W_2$ is a total peak area within a molecular weight range of from 300 to 2 M on a gel permeation chromatogram of the partial hydrolysate of the fluorine-containing reactive silane;

wherein a proportion ($T_2$) of a molecule with a molecular weight of at least 6 M in the partial hydrolysate is less than 10% as calculated from Formula (B):

$$T_2(\%) = [W_3/W_1] \times 100 \quad \text{Formula (B)};$$

wherein $W_1$ is a total peak area within a molecular weight range of from 300 to 100000 on a gel permeation chromatogram of the partial hydrolysate of the fluorine-containing reactive silane; and $W_3$ is a total peak area within a molecular weight range of from 6 M to 100000 on a gel permeation chromatogram of the partial hydrolysate of the fluorine-containing reactive silane; and wherein the partial hydrolysate is obtained by partial hydrolysis of the fluorine-containing reactive silane in the presence of water and nitric acid.

21. A surface treatment composition, comprising:

a partial hydrolysate of a fluorine-containing reactive silane represented by Formula (1):

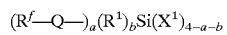  Formula (1)

wherein $R^f$ is a monovalent fluorine-containing $C_{1-30}$ organic group;

Q is a single bond or a bivalent linking group;

$R^1$ is a hydrogen atom or a monovalent $C_{1-16}$ organic group;

a is 1 or 2;

b is 0 or 1, and (a+b) is 1 or 2; and $X^1$ is a hydrolyzable group;

wherein a proportion ($T_1$) of a molecule with a molecular weight of at most 2 M in the partial hydrolysate is less than 70% as calculated from Formula (A), wherein M is a molecular weight of the fluorine-containing reactive silane measured by gel permeation chromatography:

$$T_1(\%) = [W_2/W_1] \times 100 \quad \text{Formula (A)};$$

wherein $W_1$ is a total peak area within a molecular weight range of from 300 to 100000 on a gel permeation chromatogram of the partial hydrolysate of the fluorine-containing reactive silane; and $W_2$ is a total peak area within a molecular weight range of from 300 to 2 M on a gel permeation chromatogram of the partial hydrolysate of the fluorine-containing reactive silane;

wherein a proportion ($T_2$) of a molecule with a molecular weight of at least 6 M in the partial hydrolysate is less than 10% as calculated from Formula (B):

$$T_2(\%) = [W_3/W_1] \times 100 \quad \text{Formula (B)};$$

wherein
- $W_1$ is a total peak area within a molecular weight range of from 300 to 100000 on a gel permeation chromatogram of the partial hydrolysate of the fluorine-containing reactive silane; and
- $W_3$ is a total peak area within a molecular weight range of from 6 M to 100000 on a gel permeation chromatogram of the partial hydrolysate of the fluorine-containing reactive silane; and
- wherein the partial hydrolysate is obtained by partial hydrolysis of the fluorine-containing reactive silane in the presence of aqueous nitric acid and an organic solvent.

22. The surface treatment composition according to claim 21, wherein the organic solvent is present in such an amount that a concentration of the compound of formula (1) is 0.1–10 wt % based on total weight of the surface treatment composition.

23. The surface treatment composition according to claim 22, wherein the organic solvent is a lower alcohol.

24. The surface treatment composition according to claim 1, which contains from 0.005 to 0.100 wt % of nitrate ion, from 0.5 to 3 wt % of water, and an organic solvent in such an amount that a concentration of the compound of formula (1) is 0.1–10 wt % based on total weight of the surface treatment composition.

25. The surface treatment composition according to claim 1, wherein the partial hydrolyzate is the product of co-hydrolysis of said silane of Formula (1) and at least one other silane represented by Formula (2):

wherein
$R^f$, Q, $R^1$ and $X^1$ are as defined above, and $R^2$ is a hydrogen or a monovalent $C_{1-16}$ organic group.

* * * * *

UNITED STATES PATENT AND TRADEMARK OFFICE
CERTIFICATE OF CORRECTION

PATENT NO. : 6,733,892 B1
DATED : May 11, 2004
INVENTOR(S) : Takashige Yoneda et al.

It is certified that error appears in the above-identified patent and that said Letters Patent is hereby corrected as shown below:

Title page,
Item [*] Notice, "Subject to any disclaimer, the term of this patent is extended or adjusted under 35 U.S.C. 154(b) by 277 days" should read -- Subject to any disclaimer, the term of this patent is extended or adjusted under 35 U.S.C. 154(b) by 397 days. --.

Signed and Sealed this

Sixth Day of September, 2005

JON W. DUDAS
*Director of the United States Patent and Trademark Office*